United States Patent
Orlik et al.

(10) Patent No.: US 9,681,459 B2
(45) Date of Patent: Jun. 13, 2017

(54) ASSIGNMENT OF BACKHAUL RESOURCES IN COOPERATIVE WIRELESS NETWORKS

(71) Applicant: Mitsubishi Electric Research Laboratories, Inc., Cambridge, MA (US)

(72) Inventors: Philip Orlik, Cambridge, MA (US); Talha Khan, Austin, TX (US); Kyeong Jin Kim, Lexington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 140 days.

(21) Appl. No.: 14/595,314

(22) Filed: Jan. 13, 2015

(65) Prior Publication Data

US 2016/0205694 A1 Jul. 14, 2016

(51) Int. Cl.
*H04W 4/00* (2009.01)
*H04W 72/08* (2009.01)
(Continued)

(52) U.S. Cl.
CPC ......... *H04W 72/082* (2013.01); *H04L 5/0035* (2013.01); *H04W 28/16* (2013.01); *H04W 88/08* (2013.01)

(58) Field of Classification Search
None
See application file for complete search history.

(56) References Cited

U.S. PATENT DOCUMENTS

| 6,748,212 B2 | 6/2004 | Schmutz et al. |
| 8,358,577 B1* | 1/2013 | Khanka ............... H04L 41/0663 370/221 |
| 2007/0147287 A1* | 6/2007 | Jalil ...................... H04W 16/06 370/329 |
| 2007/0218910 A1 | 9/2007 | Hill et al. |
| 2009/0180428 A1* | 7/2009 | Viswanath ............ H04W 48/20 370/328 |
| 2011/0151877 A1* | 6/2011 | Tafreshi ................ H04W 36/18 455/442 |

(Continued)

FOREIGN PATENT DOCUMENTS

| EP | 2498530 A1 | 9/2012 |
| EP | 2538603 A1 | 12/2012 |
| WO | 2014093050 A1 | 6/2014 |

OTHER PUBLICATIONS

Zoltan et al., "On the Impact of Backhaul Channel Reliability on Cooperative Wireless Networks," 2013 IEEE International Confrernce on Communications, ICC, IEEE, Jun. 9, 2013, pp. 5284-5289.

(Continued)

*Primary Examiner* — Kwang B Yao
*Assistant Examiner* — Juvena Loo
(74) *Attorney, Agent, or Firm* — Gene Vinokur; James McAleenan; Hironori Tsukamoto (57) ABSTRACT

A method assigns backhaul links in a cooperative wireless network including a control unit (CU) connected to a set of access points (APs) by a set of backhaul links, and wherein the APs are connected to an end user by wireless channels. A reliability of each backhaul link is determined to produce a set of reliabilities. A distance between each AP and the end user is determined to produce a set of distances. Using the set of reliabilities and the set of distances, probabilities of successful reception of a message transmitted from the CU to the end user via the backhaul links and the wireless channels are determined. Then, the backhaul links are assigned according to the probabilities of successful reception of the message by the end user.

12 Claims, 6 Drawing Sheets

(51) Int. Cl.
*H04L 5/00* (2006.01)
*H04W 28/16* (2009.01)
*H04W 88/08* (2009.01)

(56) References Cited

U.S. PATENT DOCUMENTS

| | | | | |
|---|---|---|---|---|
| 2011/0299422 | A1* | 12/2011 | Kim | H04W 48/16 370/253 |
| 2014/0022918 | A1* | 1/2014 | Guo | H04W 48/20 370/252 |
| 2015/0020157 | A1* | 1/2015 | Kim | H04W 12/06 726/3 |
| 2016/0036673 | A1* | 2/2016 | Meirosu | H04L 41/145 370/252 |
| 2016/0157242 | A1* | 6/2016 | Van Den Bosch | H04W 72/08 370/329 |

OTHER PUBLICATIONS

J. Andrews, S. Buzzi, W. Choi, S. Hanly, A. Lozano, A. Soong, and J. Zhang, "What will 5G be?," IEEE J. Sel. Areas in Commun., vol. 32, pp. 1065-1082, Jun. 2014.

J. Andrews, "Seven ways that HetNets are a cellular paradigm shift," IEEE Commun. Mag., vol. 51, pp. 136-144, Mar. 2013.

O. Tipmongkolsilp, S. Zaghloul, and A. Jukan, "The evolution of cellular backhaul technologies: Current issues and future trends," IEEE Commun. Surveys Tutorials, vol. 13, pp. 97-113, 2011.

M. Coldrey, H. Koorapaty, J. Berg, Z. Ghebretensae, J. Hansryd, A. Derneryd, and S. Falahati, "Small-cell wireless backhauling: A non-line-of-sight approach for point-to-point microwave links," in Proc. IEEE Veh. Tech. Conf., Quebec City, Canada, Sep. 2012.

O. Simeone, O. Somekh, E. Erkip, H. Poor, and S. Shamai, "Robust communication via decentralized processing with unreliable backhaul links," IEEE Trans. Inf. Theory, vol. 57, pp. 4187-4201, Jul. 2011.

F. Pantisano, M. Bennis, W. Saad, M. Debbah, and M. Latva-aho, "On the impact of heterogeneous backhauls on coordinated multi-point transmission in femtocell networks," in Proc. IEEE Int. Conf. Commun., Ottawa, Canada, Jun. 2012.

Z. Mayer, J. Li, A. Papadogiannis, and T. Svensson, "On the impact of backhaul channel reliability on cooperative wireless networks," in Proc. IEEE Int. Conf. Commun., Jun. 2013.

S. Nadarajah, "A review of results on sums of random variables," Acta Applicandae Mathematicae, vol. 103, No. 2, pp. 131-140, 2008.

* cited by examiner

ASSIGNMENT OF BACKHAUL RESOURCES IN COOPERATIVE WIRELESS NETWORKS

FIELD OF THE INVENTION

This invention relates generally to wireless communications and networks, and more particularly to cooperative networks where multiple access points (APs) transmit the same message to an end user device using the same time and frequency resources and wherein the APs obtain the message via a set of unreliable backhaul links.

BACKGROUND OF THE INVENTION

Driven by the sheer popularity of mobile devices, data-intensive applications, and emerging paradigms such as the Internet of Things (IOT), traffic volume is predicted grow exponentially. To keep pace with the growing traffic demands, wireless network are expected become more dense and heterogeneous in the future.

With such massive access point (AP) deployments, the backhaul links connecting the APs to the network backbone, or "cloud," are also expected to become denser. However, given the excessive costs associated for a highly-reliable wired backhaul, future backhaul links will most likely be wireless and thus inherently unreliable. Moreover, this network densification will also make backhaul deployment more challenging due to topology and access issues. This suggests that the future backhaul infrastructure would mostly comprise non-line-of-sight (non-LOS) links. This marks a departure from conventional wireless networks, which have traditionally been assumed to have highly reliable, e.g., by optical fiber or LOS wireless backhaul links.

For the above, see generally Andrews et al., "What will 5G be?" IEEE J. Sel. Areas in Commun., vol. 32, pp. 1065-1082, June 2014, Andrews, "Seven ways that HetNets are a cellular paradigm shift," IEEE Commun. Mag., vol. 51, pp. 136-144, March 2013, Tipmongkolsilp et al., "The evolution of cellular backhaul technologies: Current issues and future trends," IEEE Commun. Surveys Tutorials, vol. 13, pp. 97-113, 2011, and Coldrey et al., "Small-cell wireless backhauling: A non-line-of-sight approach for point-to-point microwave links," Proc. IEEE Veh. Tech. Conf., Canada, September 2012.

This paradigm shift in wireless network architecture has spurred significant interest in the design and analysis of wireless networks with unreliable backhaul links. The impact of finite capacity backhaul on network performance and optimal compression schemes is described by Simeone et al., "Robust communication via decentralized processing with unreliable backhaul links," IEEE Trans. Inf. Theory, vol. 57, pp. 4187-4201, July 2011, and references therein. There, the assignments are fixed assignment, and the unreliable nature of the backhaul link is dealt with using compression of the message.

Another line of work considers cooperative wireless network with heterogeneous backhaul, see Pantisano et al., "On the impact of heterogeneous backhauls on coordinated multipoint transmission in femtocell networks," Proc. IEEE Int. Conf. Commun., June 2012. There, a game-theoretic approach is used to study the impact of a heterogeneous backhaul on the downlink performance of a cooperative femtocell network.

In related work, the downlink of a coordinated multi-point network is considered to study the impact of unreliable backhaul on network performance, see Z. Mayer, J. Li, A. Papadogiannis, and T. Svensson, "On the impact of backhaul channel reliability on cooperative wireless networks," in Proc. IEEE Int. Conf. Commun., Budapest, Hungary, June 2013. It was shown that unreliable backhaul could severely limit the performance gains promised by cooperation.

U.S. Pat. No. 6,748,212 describes a method to monitor the effect of adjacent and co-channel interference on a single backhaul link.

U.S. Publication describes a method for assigning a backhaul site to an access point via a beam steering approach where the AP has multiple antennas. There, a selection among multiple possible backhaul sites, based on the loading of each particular backhaul site, is conducted.

WO 2014093050 Patent describes a method for optimizing backhaul transport based on user data priority. When a highly reliable backhaul link becomes congested some of the low priority data can be switched onto a backhaul link with lower priority.

As described above, in modern wireless networks, it is not uncommon to encounter cooperative networks where a group of multiple wireless nodes (or APs) transmit a message to an end user (receiver or client) using the same time-frequency resources. A control unit (CU) is connected to each AP via unreliable backhaul links. The backhaul links are independent and can have different reliabilities. The CU needs to schedule the backhaul resources to communicate with each AP in order to maximize the overall communication reliability from the CU to the end user.

SUMMARY OF THE INVENTION

A control unit (CU) simultaneously communicates with a set of K access points (APs) using K independent backhaul links, which can be unreliable. The backhaul links are used to provide a message, to the APs. Then, the message is transmitted simultaneously from the APs to an end user.

Logic in the control unit (CU)) needs to assign the backhaul links to the APs such that the network performance is reliable even though the CU may not have an instantaneous knowledge about the wireless channels from the APs to the end user. The CU can have information about the long-term reliability of each backhaul link and also knows the distance between each AP and the end user.

The embodiments of the invention provide an analytical model of a cooperative wireless network with a backhaul that allows for direct computation of optimal assignment of backhaul links and resources to APs. Thus, given a network where only statistical knowledge of the backhaul link reliability and end user location information is used, backhaul assignments can be rapidly determined and applied to the network.

DETAILED DESCRIPTION OF THE PREFERRED EMBODIMENT

Cooperative Wireless Network

Figure 1A:
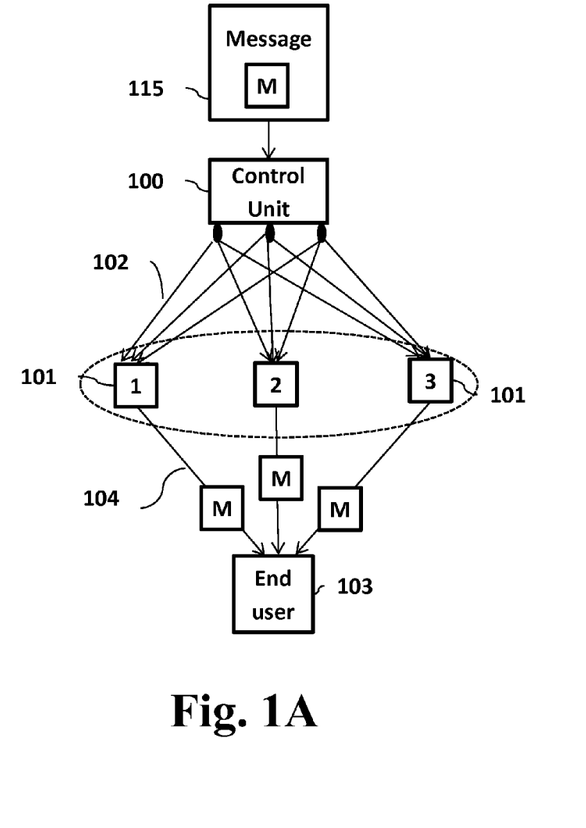
FIG. 1A is a schematic of a cooperative wireless network in which embodiments of the invention operate.

FIG. 1A shows an example cooperative wireless network in which the embodiments of the invention operate. The network includes a control unit (CU) 100, a set of access points (APs 1, 2, and 3) 101, and an end user 103, e.g., a receiver or "client." The set of APs 101 cooperate to simultaneously transmit symbols s in a message 115 to the end user 103 over potentially fading wireless channels 104 using the same time and frequency resources. The message is obtained from the CU.

In the example network, there are K=3 APs and one end user. There are K=3 backhaul links 102 that can be assigned to the three APs. This leads to a problem of determining the best backhaul assignment from K!, i.e., 6, possible assignments.

FIG. 1A shows all possible backhaul assignments. The assignments are determined by the CU based on a limited knowledge of the overall network. For example, the CU may only know an average (long-term) reliability, e.g., in terms of a probability of successful message reception, for each of the backhaul links. In addition, the CU may not know the channel state or reliability of the wireless links, connecting the APs to the end user.

Figure 1B:
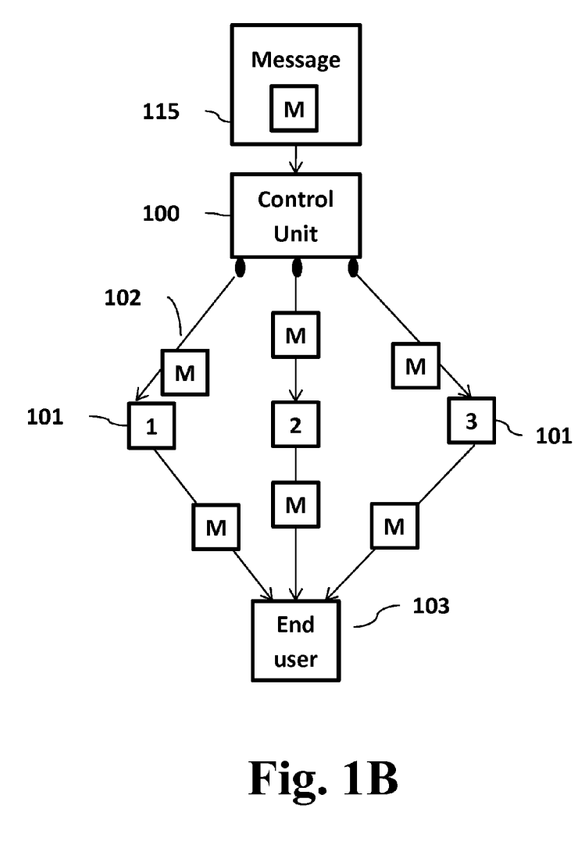
FIG. 1B is a schematic of one possible assignment of the backhaul links to the Access Points.

FIG. 1B is a schematic of one possible assignment of the backhaul links to the APs according to embodiments of the invention.

Method for Assigning Based on Probability of Successful Reception

Figure 2A:
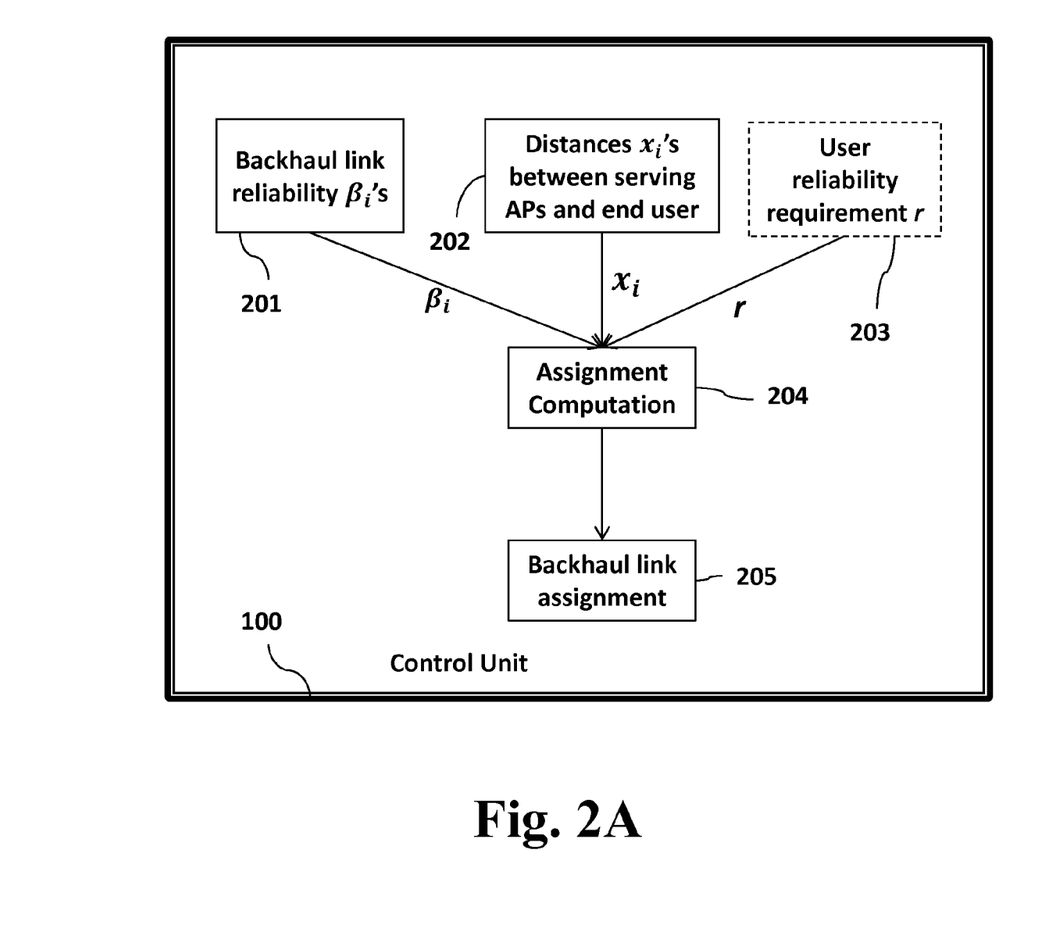
FIG. 2A is a flow diagram of a method for assigning backhaul links according to embodiments of the invention.

FIG. 2A is a block diagram of a method for assigning backhaul links according to one embodiment of the invention. The CU determines 201 a reliability $\beta_i$ of each backhaul link. The CU also determines 202 a distance $x_i$ between each AP and the end user. Optionally, the CU also determines 203 a desired reliability requirement r for the end user. This option is used where the user expects some predetermined reliability as described below.

Generally, the parameters $\beta_i$, $x_i$, r can be measured, predetermined or estimated by the CU, or obtained from elsewhere in the network, e.g., from the APs and end user in feedback information.

The parameters are used by an assignment computation block 204 in the CU to determine probabilities, according to an analytical expression, of successful reception of the message by the end user. Each of the possible backhaul assignments can be evaluated in this manner. Then, the assignments 205 can be made according to the probabilities, e.g., in a high to low probability order.

The method can be implemented in a microprocessor, field programmable gate array (FPGA), digital signal processor (DSP), or custom logic.

Method for Assigning Based on Equal Power Transmission

Figure 2B:
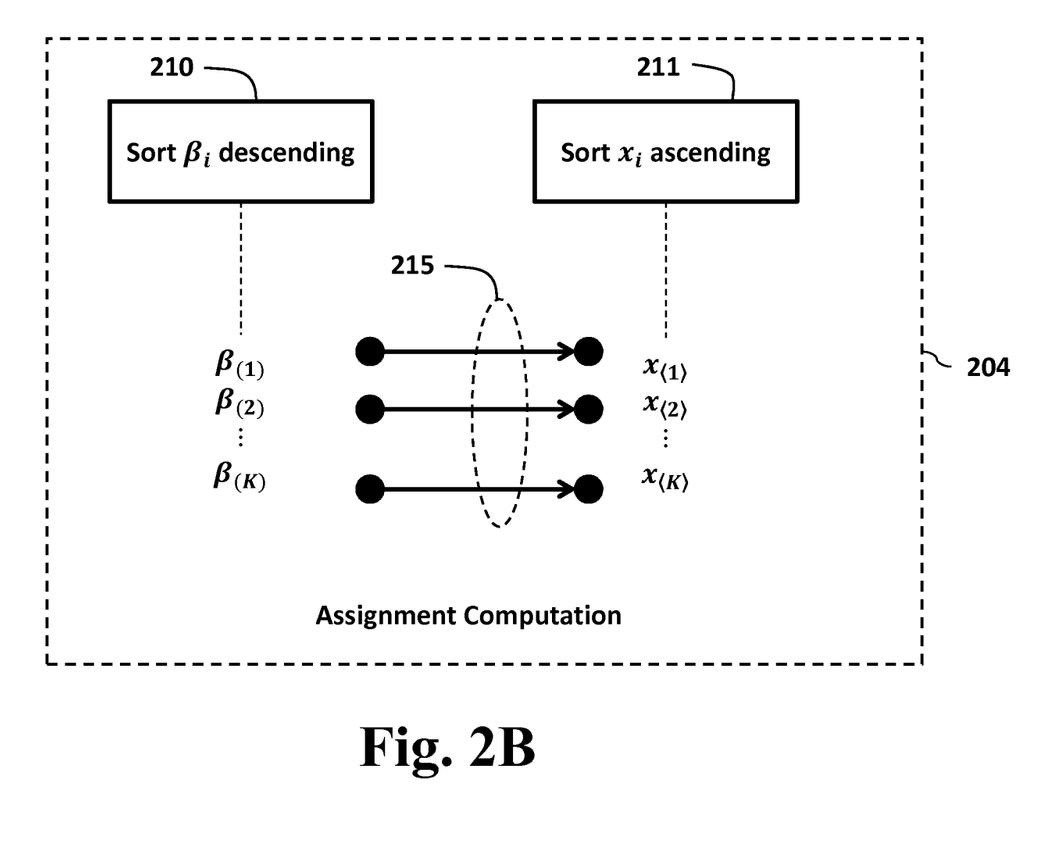
FIG. 2B is a flow diagram of backhaul assignment based on equal power transmission at the APs according to one embodiment of the invention.

FIG. 2B shows another embodiment. Here, the assignment computation 204 is based on equal power transmission at the APs and the same path loss coefficients for the backhaul links. The CU sorts 210 the link reliabilities $\{\beta_i\}_{i=1}^K$ in a descending order with the notation $\beta_{(i)}$ defining the $i^{th}$ largest value.

For example, $\beta_{(1)}=\max(\{\beta_i\}_{i=1}^K)$, and $\beta_{(K)}=\min(\{\beta_i\}_{i=1}^K)$. The CU sorts 211 the distances $\{x_i\}_{i=1}^K$ associated with each AP in an ascending order. The notation $x_{(i)}$ is used to represent the $i^{th}$ smallest distance. Thus, $x_{(1)}=\min(\{x_i\}_{i=1}^K)$ and $x_{(K)}=\max(\{x_i\}_{i=1}^K)$. The arrows 215 show the assignment that is produced by using the most reliable backhaul link to transmit the message to the AP nearest the end user, the second most reliable backhaul link to transmit the message the second nearest, so on. In other words, assigning the backhaul links is in the descending order of the distances and the ascending order of the distances.

Backhaul Reliabilities

We define $\beta_i$, (i=1, 2, ..., k) as the backhaul reliability for each of the K links. Additionally, for the time being, we consider that the $i^{th}$ backhaul link is used to transmit the message to the $i^{th}$ AP 101. Thus, the $i^{th}$ AP successfully decodes the message transmitted over the backhaul link with probability A. The message is erased (not decoded) with probability 1-$\beta_i$ due to an unreliable backhaul link. We assume the erasures to be independent across messages. Therefore, we model the probabilities using a Bernoulli distribution Bern($\beta_i$). The model can also include operating conditions contributing to a link failure, e.g., incorporate network congestion, delay, hardware imperfections, etc., by defining $\beta_i$ to be a function of these parameters.

Distances

We define $\{x_i\}_1^K$ to be the distances between the APs and the end user. We assume that the transmitter-receiver links undergo independent and identically distributed (i.i.d.) block flat Rayleigh fading with coefficients $\{H_i\}_{i=1}^K$ such that the corresponding channel power gains $\{H_i\}_{i=1}^K$ are exponential with unit means, where $H_i=|h_i^2|$). Assuming that each AP has perfect channel knowledge, the $i^{th}$ AP uses linear beamforming with coefficient $$v_i = \frac{h_i^*}{|h_i|}$$

to transmit information symbol s in the message 115, where s is drawn from a normalized constellation, i.e., E[s]=0 and E[|s|²]=1). If AP i transmits with power $P_i$, then the signal received at the receiver at time t is $$y(t)=\Sigma_{i=1}^K \sqrt{\mathbb{I}_i(t)P_i x_i^{-\eta}} h_i v_i(t)s(t)+n(t),$$

where an indicator function $\mathbb{I}_i(t)$ is used to model the unreliability of backhaul links such that $\Pr\{\mathbb{I}_i(t)=1\}=\beta_i$ and $\Pr\{\mathbb{I}_i(t)=0\}=1-\beta_i$. The noise n(t) is assumed to be zero-mean complex Gaussian with variance $\sigma^2$. Omitting the time index t for simplicity, the instantaneous signal-to noise ratio (SNR) at the receiver is $$SNR_u = \frac{\left|\sum_{i=1}^K \sqrt{\mathbb{I}_i P_i x_i^{-\eta}} |h_i|\right|^2}{\sigma^2} \geq \sum_{i=1}^K \mathbb{I}_i \rho_i H_i x_i^{-\eta} \equiv \gamma,$$

where $H_i=|h_i|^2$ and $$\rho_i = \frac{P_i}{\sigma^2}.$$

In the above, $\gamma$ denotes a lower bound on the instantaneous received SNR. Herein, we describe how this lower bound can be evaluated and used to characterize the performance at the receiver for given backhaul link assignments. Given that this bound is tight, we can develop a method to assign backhaul links to APs so that performance objectives, e.g., the probability of successful reception can be fulfilled.

At the end user, we define the probability of successful reception $p_s$ as a function of the number of APs K, transmit SNR, $$\rho_i = \frac{P_i}{\sigma^2},$$

and an outage threshold θ as $$p_s(K, \{\rho_i\}_{i=1}^K, \theta) = Pr\{\gamma > \theta\} = Pr\{\Sigma_{i=1}^K \mathbb{I}_i \rho_i H_i x_i^{-\eta} > \theta\}.$$

We define $\hat{H}_i = \rho_i |h_i|^2 x_i^{-\eta}$, and note that the summation in the above expression can be written as $\Sigma_{i=1}^L \mathbb{I}_i \hat{H}_i$. This expression is a sum of independent but non-identically distributed Bernoulli-weighted exponential random variables i.e., $\hat{H}_i \sim \exp(\rho_i^{-1} x_i^\eta)$.

We now derive a generalized closed-form expression for the distribution of a sum of Bernoulli-weighted exponentials and then use the sum to characterize the SNR distribution at the receiver.

Consider a sum of K independent Bernoulli-weighted exponential random variables ($\{\epsilon_i\}_{i=1}^K$), such that $S_K = \Sigma_{i=1}^K \epsilon_i$ with $\epsilon_i = z_i G_i$. Here $z_i$ is a Bernoulli variable distributed with parameter $p_i \equiv 1 - q_i$, that is $z_i \sim \text{Bern}(p_i)$, and each $z_i$ is assumed to be independent across i. Independently of the $z_i$'s, we define $\{G_i\}_{i=1}^K$ to be independent exponential random variables with distinct means such that $G_i \sim \exp(\lambda_i)$, $\lambda_i \in \Lambda$ and $\Lambda = \{\lambda_1, \ldots, \lambda_K\}$. For ease of this description, we define $$\hat{\Lambda} = \left\{\frac{\lambda_1}{q_1}, \ldots, \frac{\lambda_1}{q_1}\right\}$$

and $Q = \Pi_{i=1}^K q_i$. Then, the complementary cumulative distribution function (CCDF) $F_{S_k}^c(\theta) = Pr\{S_k > \theta\}$ of the sum, $S_k$, can be expressed as $$F_{S_k}^c(\theta) = \begin{cases} 1 & \theta < 0 \\ Q \sum_{j=1}^K \left(\frac{\sum_{i=0}^{K-1} (\alpha_i(\hat{\Lambda}) - \alpha_i(\Lambda))(\lambda_j)^i}{\lambda_j (\Pi_{l \neq j}^K \lambda_l - \lambda_j)}\right) e^{-\lambda_j \theta} & \theta \geq 0, \end{cases}$$

where $$\alpha_i(\Lambda) = (-1)^i C_\Lambda^{K-i}$$

and $$C_\Lambda^{K-i} = \sum^+ \left[\binom{K}{K-i}_\Lambda\right],$$

where the operator $\Sigma^+[\cdot]$ returns the sum of the elements of the set.

The notation $$\binom{K}{K-i}_\Lambda$$

is defined to be the set of all products of the elements of Λ taken K−i at a time. There for the set $$\binom{K}{K-i}_\Lambda$$

has cardinality $$\binom{K}{K-i}.$$

If we consider K=3 exponential random variables with parameters $\Lambda = \{\lambda_1, \lambda_2, \lambda_3\}$, then we have $$\binom{3}{1}_\Lambda = \{\lambda_1, \lambda_2, \lambda_3\}, \binom{3}{2}_\Lambda = \{\lambda_1\lambda_2, \lambda_2\lambda_3, \lambda_1\lambda_3\} \text{ and}$$

$$\binom{3}{3}_\Lambda = \{\lambda_1\lambda_2\lambda_3\}.$$

With the above definitions, we can now express the probability of successful reception for the network of FIG. 1B. Recall that the K access points 101 are connected to the control unit via K unreliable backhaul links and that access point 1 uses backhaul link 1, access point 2 uses backhaul link 2, and so forth until the $K^{th}$ access point is assigned the $K^{th}$ backhaul link. We also assume that the access points are located at distances $x_1, x_2, \ldots, x_K$ from the end user 103, where $x_i$ is the distance of the $i^{th}$ access point to the end user.

We define $\mathcal{B} = \{\rho_1^{-1} x_1^\eta, \ldots, \rho_K^{-1} x_K^\eta\}$, $$\hat{B} = \left\{\frac{\rho_1^{-1} x_1^\eta}{1 - \beta_1}, \ldots, \frac{\rho_K^{-1} x_K^\eta}{1 - \beta_K}\right\},$$

and $\overline{B} = \Pi_{i=1}^K (1 - \beta_i)$. We can think of the set $\mathcal{B}$ as a set of parameters that provide the expected received SNRs assuming that each of the APs transmitted the message. Likewise, the set $\hat{\mathcal{B}}$ can be thought of as the same set of SNRs, however, this time normalized by the failure probability of the particular backhaul link that is used by the CU to transmit the message to the access point. For the set $\mathcal{B}$ defined as $$\hat{B} = \left\{\frac{\rho_1^{-1} x_1^\eta}{1 - \beta_1}, \ldots, \frac{\rho_K^{-1} x_K^\eta}{1 - \beta_K}\right\},$$

we assume that the 1$^{st}$ backhaul link (with success parameter $\beta_1$) is assigned to the 1$^{st}$ AP and so on, with the $K^{th}$ backhaul link assigned to the $K^{th}$ AP. This is the case that is shown in FIG. 1B.

We can now use the formula derived for the CCDF of the sum of Bernoulli weighted random variables derived above to express the outage probability of the network in FIG. 1B as $$p_s(K, \{\{\rho_i\}\}_{i=1}^K, \theta) = Pr\{\gamma > \theta\} = \qquad (1)$$

$$\overline{B} \sum_{j=1}^K \left(\frac{\sum_{i=0}^{K-1} (\alpha_i(\hat{B}) - \alpha_i(B))(\rho_j^{-1} x_j^\eta)^i}{\rho_j^{-1} x_j^\eta (\Pi_{l \neq j}^K \rho_l^{-1} x_l^\eta - \rho_j^{-1} x_j^\eta)}\right) e^{-\rho_j^{-1} x_j^\eta \theta}.$$

Thus, we have a closed-form expression that takes the backhaul reliabilities and distances as input, and outputs that the probability of successfully reception of the message 115 by the end user.

Of course, a particular assignment of backhaul links impacts the overall probability of successful reception. Of particular interest is the assignment that provides the greatest reliability. The equation for the success probability can be used by the CU to determine this optimal assignment. Essentially, the CU is provided with a set of K backhaul link reliability measures $\beta_i$'s, and estimates of the distances $x_i$'s between the APs and the end users. For the case when each of the APs uses the same transmit power, $P_i=P$ for all i. The rule is to simply assign the backhaul links in descending order of reliability starting with the nearest node. Thus backhaul link with the largest success probability, max $(\{\beta_i\}_{i=1}^{K})$, is assigned to the AP that is nearest to the end user, i.e., min $(\{x_i\}_{i=1}^{K})$. Subsequent assignments are carried out in a similar fashion for the remaining backhaul links.

In general, there are K! ways to assign the K backhaul links to the AP. In the case of equal transmit powers and known or estimated AP-end user distances, the optimal assignment is as above.

We now described other embodiments of assignment methods based on relaxed assumptions about the transmit powers, wireless parameters and end user.

Assignment Computation

We further describe the operation of the assignment computation 204. In one embodiment, the computation essentially performs a search of possible backhaul assignments such that the performance of the network is optimized. Let us consider a general case where there are a set of K access points labeled 1, 2, ..., K, and a consider again the set of backhaul link reliabilities $\{\beta_i\}_{i=1}^{K} = \{\beta_1, \beta_2, \ldots, \beta_K\}$ also indexed from 1, 2, ..., K.

We can also consider any permutation of the backhaul reliabilities $\pi(\{\beta_i\}_{i=1}^{K}) = \{\beta_{\{1\}}, \beta_{\{2\}}, \ldots \beta_{\{K\}}\}$, where $\pi(\bullet)$ denotes a permutation operator, which reorders the set $\{\beta_i\}_{i=1}^{K}$. For ease of notation, we define the permuted set of backhaul reliabilities as $\beta_\pi = \pi(\{\beta_i\}_{i=1}^{K}) = \{\beta_{\{1\}}, \beta_{\{2\}}, \ldots \beta_{\{K\}}\}$. Using the permuted set $\beta_\pi$, we can define another backhaul assignment where the backhaul link $\beta_{\{1\}}$ is assigned to AP 1, and $\beta_{\{2\}}$ is assigned to AP 2 and so on.

As described above, there are K! unique permutations of the set $\{\beta_i\}_{i=1}^{K}$ and therefore there are K! unique assignments that can be considered. We now consider the probability of success for the permuted assignment. To do so, we define $$\widetilde{\beta_\pi} = \left\{ \frac{\rho_1^{-1} x_1^\eta}{1-\beta_{\{1\}}}, \frac{\rho_2^{-1} x_2^\eta}{1-\beta_{\{2\}}}, \ldots, \frac{\rho_K^{-1} x_K^\eta}{1-\beta_{\{K\}}} \right\}.$$

We can write an expression for the probability of success based on equation (1) as $$p_s(K, \{\rho_i\}_{i=1}^{K}, \theta; \pi) = \quad (2)$$

$$Pr\{\gamma > \theta\} = \overline{B} \sum_{j=1}^{K} \left( \frac{\sum_{i=0}^{K-1} (\alpha_i(\vec{B_\pi}) - \alpha_i(B))(\rho_j^{-1} x_j^\eta)^i}{\rho_j^{-1} x_j^\eta (\Pi_{l\neq j}^{K} \rho_l^{-1} x_l^\eta - \rho_j^{-1} x_j^\eta)} \right) e^{-\rho_j^{-1} x_j^\eta \theta},$$

where we use the notation $p_s(K, \{\rho_i\}_{i=1}^{K}, \theta; \pi)$ to indicate that the success probability is for the assignment defined by the permutation $\pi(\ )$. We note that the only difference between equation (1) and equation (2) is the use of the set $\widetilde{\beta_\pi}$.

Figure 3:
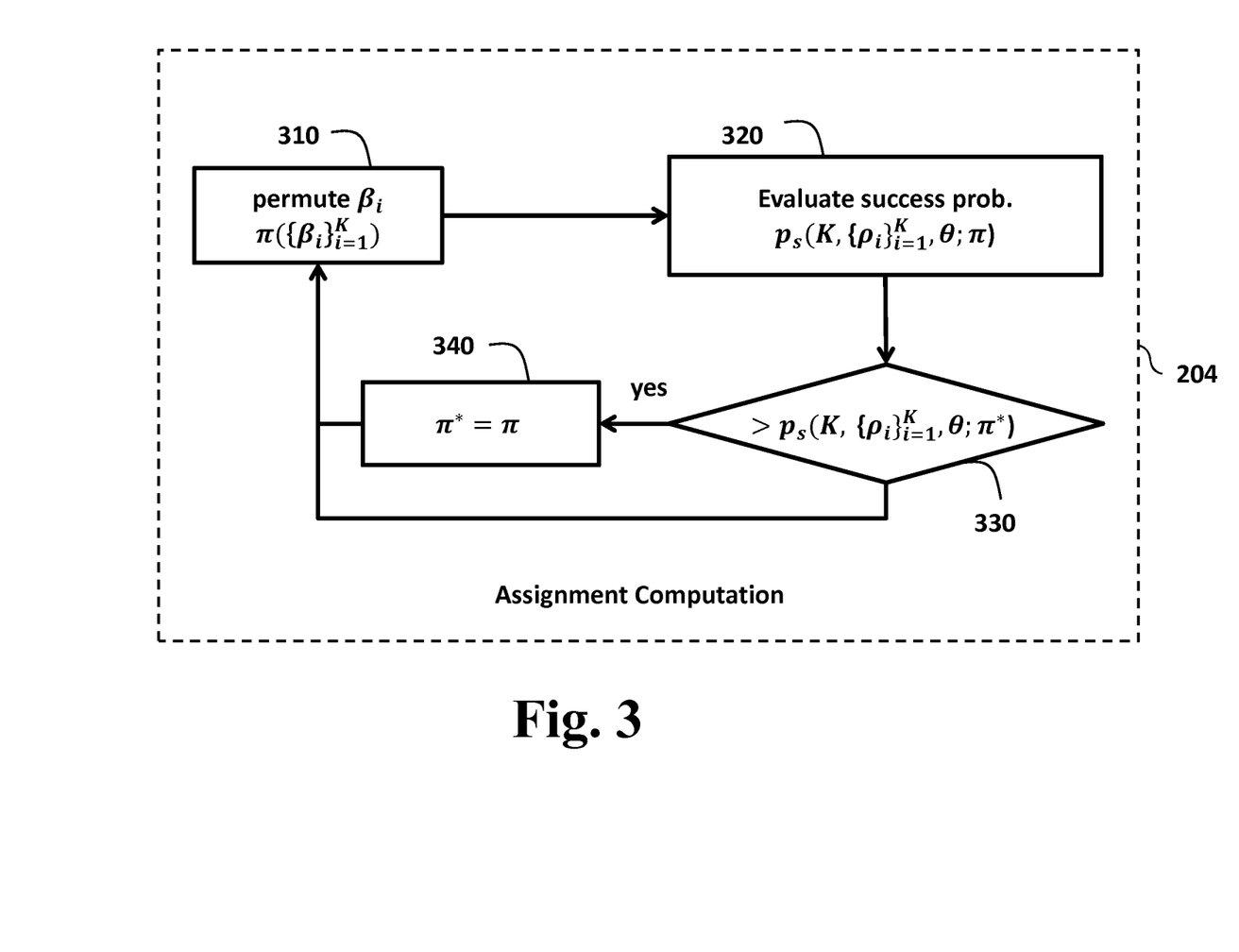
FIG. 3 is a flow diagram of a procedure for determining probabilities for backhaul assignment according to embodiments of the invention.
Figure 4:
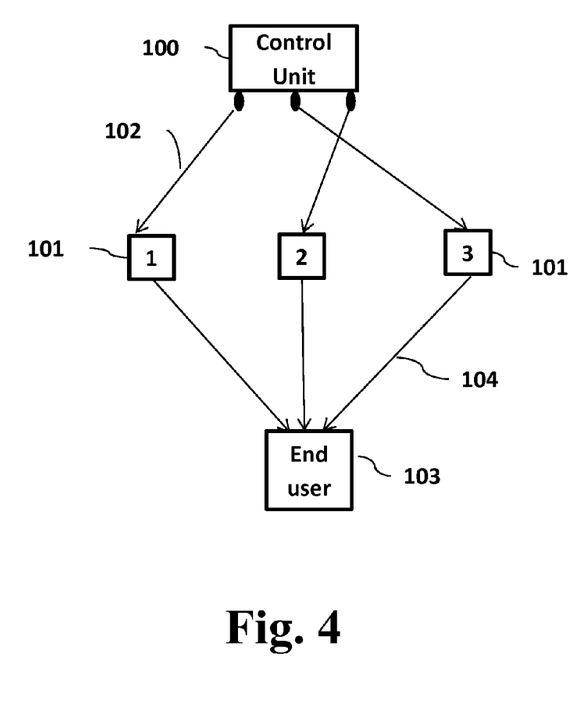
FIG. 4 is a schematic of a possible backhaul assignment according to one embodiment of the invention.

As shown in FIG. 3, we describe a method in which the CU can determine an optimal assignment of K back haul links to K APs when there are differing transmit powers $P_i$, and path loss exponents, $\eta_i$ at each of the APs. We assume that the CU has access to either the true value of the above network parameters or has the ability to use estimates of the parameters.

The CU generates 310 the set of permuted probabilities, and assumes an assignment according the set $\widetilde{\beta_\pi}$, The CU evaluates 320 the success probability according to equation 2. To obtain $p_s(K, \{\rho_i\}_{i=1}^{K}, \theta; \pi^*)$, where $\pi^*$ denotes the permutation that has the best success probability that has been obtain so far. Then, the CU generates another permutation of the backhaul reliabilities and the associated set $\widetilde{\beta_\pi}$, and again evaluates the success probability.

If 330 the success probability of the newly generated permutation is greater than $p_s(K, \{\rho_i\}_{i=1}^{K}, \theta; \pi^*)$, then the CU replaces 340 $\pi^*$ with $\pi$. The process continues until all K! permutations have been evaluated. It is expected that the number of APs in a set will become large as the density of APs in a network is limited by cost and installation expenses values of K, up to 6, are reasonable and thus the number of permutations that need to be tested remains below 720 (6!).

The CU can reduce the number of permutations evaluated when it is unnecessary to determine the optimum assignment, but an assignment that meets a target success probability, e.g., based on the user reliability requirement r. In this case, as soon as a permutation that produces a success probability, which that is greater than the target success probability r, the CU can use this assignment.

Transmit Power Reduction

An alternative embodiment minimizes the transmit powers of the APs. Minimizing the powers is of interest because the example network is typically part of a larger network serving multiple end users via other sets of APs. Thus, minimizing the transmit powers of the AP also reduces the interference at other end users. We assume that a suitable permutation and assignment of the set $\widetilde{\beta_\pi}$, has initially been determined. By suitable, we mean an assignment that achieves the desired probability of success meeting the end user reliability requirements. Recall that the APs use transmit powers, $\{P_i\}_{i=1}^{K}$. The CU can perform further analysis to consider the effect of reducing the transmit powers.

Specifically, for the AP that is nearest to the end user and using power $P_C$, the CU can determine the effect of reducing the transmit power by incremental amount $\Delta$, i.e., using power $P_C-\Delta$. This transmit power can be used in the evaluation of the success probability and when the required probability of success is still achieved, the CU can continue to reduce the power in steps of $\Delta$. After a suitable power has been determined, the CU can attempt to reduce the power of the remaining AP in order of the distance to the end user. The CU can inform each AP, via some control message, as to the suggested transmit power levels that should be applied.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for assigning backhaul links in a cooperative wireless network including a control unit (CU) connected to a set of access points (APs) by a set of backhaul links, and wherein the APs are connected to an end user by wireless channels and the APs obtain a message via the set of backhaul links that are unreliable, comprising:

accessing a memory of the CU to obtain a stored long term reliability for each backhaul link, the CU determines a reliability of each backhaul link using the stored long term reliability for each backhaul link, to produce a set of reliabilities;

accessing the memory of the CU to obtain stored locations of the end user, in particular, a distance for each AP to the end user, the CU determines a distance between each AP and the end user using the stored locations of the end user, to produce a set of distances;

determining, by the CU, using the set of reliabilities and the set of distances, probabilities of successful reception of the message transmitted from the CU to the end user via the backhaul links and the wireless channels, wherein the backhaul links are configured to be assigned to any AP in the set of APs based on an overall probability of successful reception of the message by the end user; and assigning, by the CU, the backhaul links according to the probabilities of successful reception of the message by the end user.

2. The method of claim 1, further comprising:
determines a desired reliability requirement r for the end user.

3. The method of claim 1, wherein the assigning is a high to low order of the set of probabilities of successful reception.

4. The method of claim 1, wherein the assigning is based on equal power transmission at the APs and a same path loss coefficients for the backhaul links, and further comprising:
sorting the set of reliabilities in a descending order;
sorting the set of distances in an ascending order;
assigning the backhaul links in the descending order of the reliabilities and the ascending order of the distances.

5. The method of claim 1, further comprising:
modeling the probabilities of successful reception of the message transmitted from the CU to the end user via the backhaul links and the wireless channels, using a Bernoulli distribution.

6. The method of claim 5, wherein the model includes operating conditions contributing to a link failure, wherein the conditions include network congestion, delay, and hardware imperfections.

7. The method of claim 1, wherein the APs use linear beamforming with coefficient to transmit information symbol s in the message, wherein the symbols are drawn from a normalized constellation.

8. The method of claim 1, wherein the probabilities of successful reception is a function of a number of the APs, a transmit signal-to-noise ratio (SNR), and an outage threshold $\theta$.

9. The method of claim 1, further comprising:
permuting the set of reliabilities of the backhaul links to produce a set of permuted reliabilities; and
assigning the backhaul links according to the set of permutated reliabilities.

10. The method of claim 9, wherein the assigning is performed when the permuted reliabilities are greater than a user reliability requirement.

11. The method of claim 9, wherein a transmit powers of the APs is incrementally reduced while determining the probabilities of successful reception for the set of permuted reliabilities.

12. A system for assigning backhaul links in a cooperative wireless network, comprising:
a set of access points (APs) distributed within the cooperative wireless network; and
a control unit (CU) connected to the set of APs by a set of backhaul links, wherein the set of APs are connected to an end user by wireless channels and the APs obtain a message via the set of backhaul links that are unreliable;
a memory of the CU includes stored a long term reliability for each backhaul link and stored locations of the end user, in particular, a distance for each AP to the end user, the CU is configured to:
measure a reliability of each backhaul link and measure a distance between each AP and the end user by the CU;
determine a reliability of each backhaul link using the stored long term reliability for each backhaul link or the measured reliability for each backhaul link, to produce a set of reliabilities;
determine a distance between each AP and the end user using the stored locations of the end user or the measured distance between each AP and the end user, to produce a set of distances;
determine using the set of reliabilities and the set of distances, probabilities of successful reception of the message transmitted from the CU to the end user via the backhaul links and the wireless channels, wherein the backhaul links are configured to be assigned to any AP in the set of APs based on an overall probability of successful reception of the message by the end user; and
assign the backhaul links according to the probabilities of successful reception of the message by the end user.

* * * * *